United States Patent

Van Noord

[15] 3,650,606
[45] Mar. 21, 1972

[54] DAY-NIGHT REAR VIEW MIRROR AND REMOTE CONTROLS

[72] Inventor: Andrew J. Van Noord, Grand Rapids, Mich.

[73] Assignee: Kent Engineering, Grand Rapids, Mich.

[22] Filed: Dec. 4, 1969

[21] Appl. No.: 882,204

[52] U.S. Cl............................................350/282, 74/501 M
[51] Int. Cl. .........................................B60r 1/06, G02b 7/18
[58] Field of Search................................350/282; 74/501 M

[56] References Cited

UNITED STATES PATENTS

| 2,573,127 | 10/1951 | Von Bredow | 74/501 M X |
| 2,989,896 | 6/1961 | Bertell | 350/282 |
| 3,407,684 | 10/1968 | Van Noord | 74/501 M X |
| 2,746,353 | 5/1956 | Mazur et al. | 350/282 |

FOREIGN PATENTS OR APPLICATIONS

| 932,711 | 7/1963 | Great Britain | 350/282 |
| 805,312 | 12/1958 | Great Britain | 350/282 |

*Primary Examiner*—John K. Corbin
*Attorney*—Dale A. Winnie

[57] ABSTRACT

A remote control day-night rear view mirror including a reversible day-night mirror rotatably mounted on a supporting member that is pivoted in a housing shell and which includes control means for turning the mirror over, and for adjusting its viewing disposition about relatively transverse pivotal axes.

17 Claims, 10 Drawing Figures

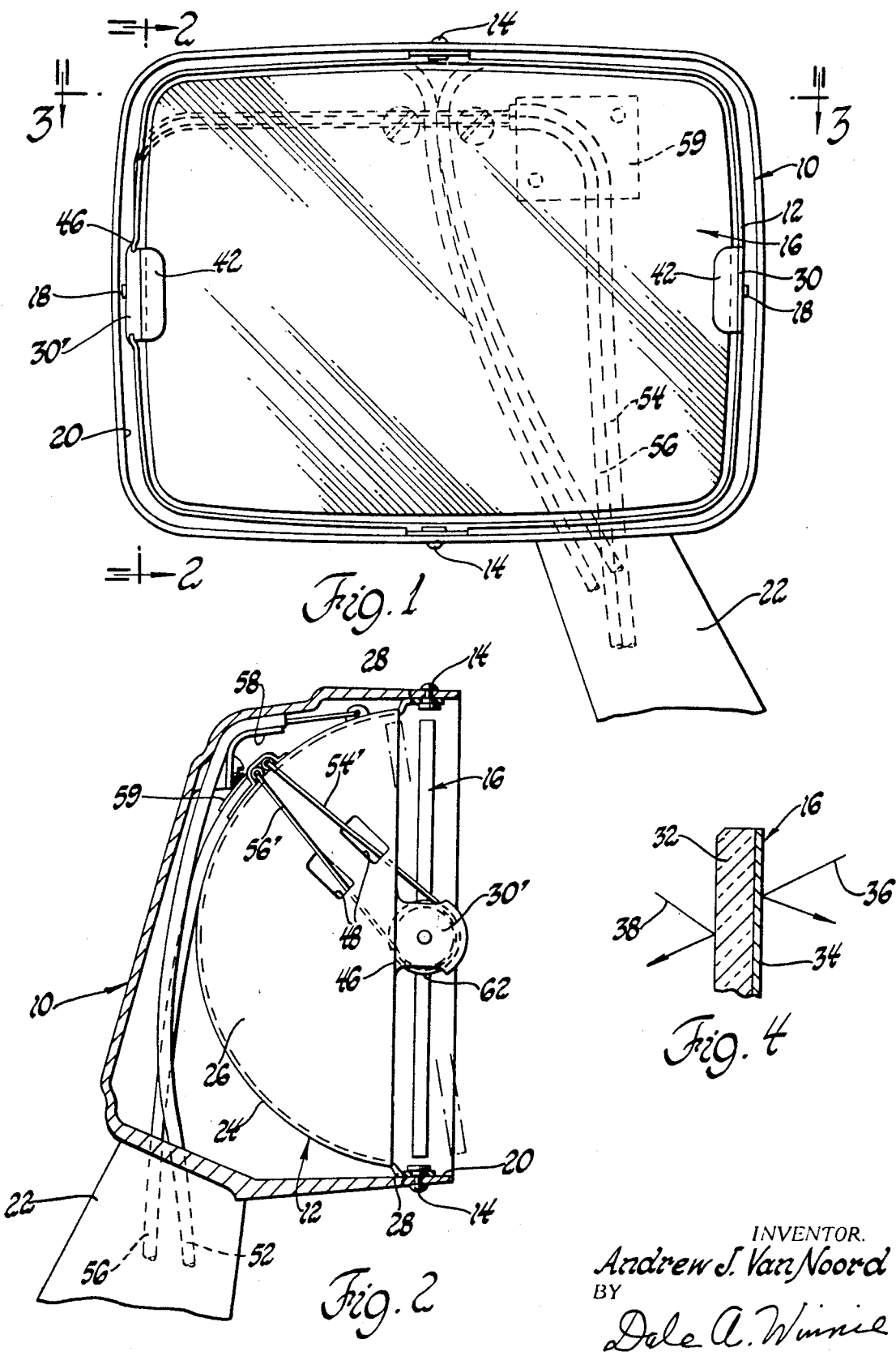

INVENTOR.
Andrew J. Van Noord
BY
Dale A. Winnie
ATTORNEY

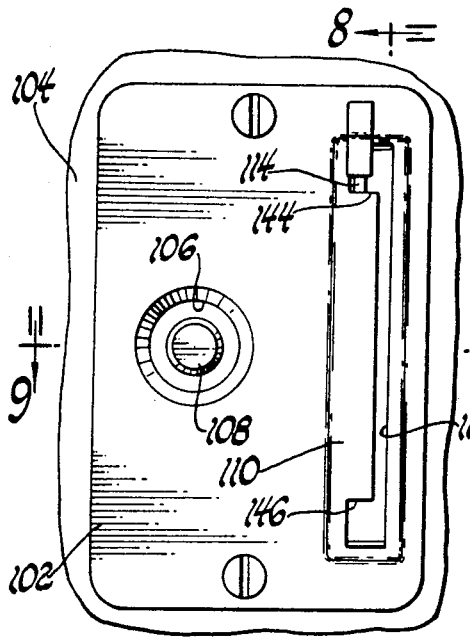
Fig. 7
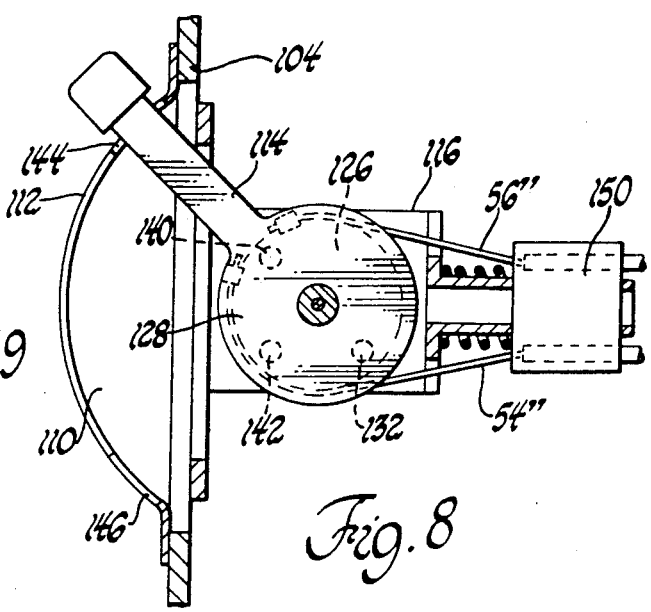
Fig. 8
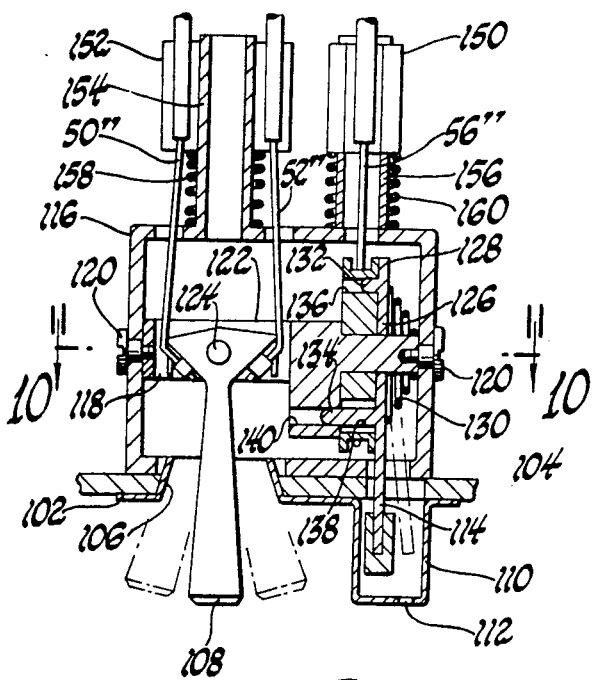
Fig. 9
Fig. 10
INVENTOR.
Andrew J. VanNoord
BY
Dale A. Winnie
ATTORNEY

DAY-NIGHT REAR VIEW MIRROR AND REMOTE CONTROLS

BACKGROUND OF THE INVENTION

Day-night rear view mirrors are commonly known as used in cars, trucks and other automotive vehicles for nighttime viewing to reduce the glare of high beam headlights caused by following traffic.

An early type of day-night mirror, used inside cars, included two mirrors placed back-to-back and pivoted to provide either a bright image reflection for daytime viewing or a darkened reflection for nighttime viewing purposes. However, the inconvenience or reaching up and manually turning the mirror over and then resetting the viewing angle soon causes such mirrors to fall into disuse.

Today's inside day-night mirrors are most commonly made with a bright image mirror that has a plain see-through glass disposed in front of it. The bright image surface is for daytime viewing and when it is tilted up, at night, so that it reflects the darkened interior of the car, the plain glass surface provides a rear view image in the same way that one sees a reflection off a window to a darkened room. Only the residual image appears on the see-through glass and the harsh headlights of following traffic are reflected off the tilted bright image surface and up over the viewer's head.

Fixed stops and detent means establish the end positions for each day-night adjustment and no other viewing adjustment is required. Consequently, this type of inside rear view, day-night mirror has received general acceptance.

Unfortunately, the same mirror cannot be used on the outside of a car without a shroud or tunnel covering since, in the absence of some such enclosure, highway and street lights, strong moonlight, overhead advertising signs and the like all contribute in preventing the upturned bright surface mirror from providing a sufficiently darkened background for a clear, plain glass reflection. Instead, there is a double image to the viewer which is very confusing, distracting and totally impossible to use when it is most needed, as for city driving.

Another problem as regards using either of the two types of day-night mirrors mentioned, for outside use, is the difficulty of providing an acceptable remote control operating mechanism. Although motor operated means have been suggested for outside rear view mirrors, they are obviously too expensive for general use. At the same time, double controls for manually changing the viewing angle, and also from daytime to nighttime viewing surfaces, are difficult to conceive as other than impractical, too expensive and too complicated to consider.

To date, no one has found a practical way to provide a manually operated remote control rear view mirror for outside day-night use, and in particular, one which is generally similar in appearance to presently known outside remote control mirrors, so that it will be reasonably close in cost thereto, and which has control means that are generally similar both for cost savings and familiarity in use to the ultimate user.

SUMMARY OF THE PRESENT INVENTION

This invention is directed to a remote control, day-night rear view mirror which is relatively simple in construction and includes a simple operating mechanism for changing either the viewing angle or the reflective surfaces for day-night viewing purposes.

A very simple double mirror structure is used. It includes a dark glass with a chrome or other bright image reflecting surface on one side. The darkened glass serves as the light absorbing media so that its plain glass surface reflects the softer view and the bright surface is used for daytime viewing. Both sides of the mirror member provide a first surface reflection and preclude the possibility of a second or double image.

The mirror member is pivotally mounted in a supporting member which is, itself, pivotally mounted in a housing of more-or-less conventional design. Pivotal movement of the mirror supporting member in the housing provides mirror adjustment about one axis and pivotal movement of the mirror, itself, provides movement in the other plane of reference.

To facilitate a change from day to night viewing surfaces, on opposite sides of the mirror member, the control for the mirror, itself, allows it to be turned through a full 180°. In fact, it allows more than this so that there is also viewing angle adjustment at both ends of the turnover movement.

The remote control operating means includes a four wire cable, or two two wire cables, and uses one set of cables to turn the mirror supporting member right or left and the other set to both turn the mirror over and to make minor up-and-down adjustments. The control is similar to what is presently used, as far as the user is concerned, and is relatively uncomplicated as regards assembly and installation.

DETAILED DESCRIPTION OF THE DRAWINGS

FIG. 1 shows an embodiment of the present invention as seen by a user.

FIG. 2 is a side view of the mirror shown in the first drawing figure as seen on the section line 2—2, through the outer housing cover, and looking in the direction of the arrows.

FIG. 4 is an enlarged cross section of a part of the mirror used.

FIG. 7 is a front view of a different control means for the same or a like mirror structure.

FIG. 8 is a side view of the controls shown in FIG. 7 as seen in the plane of line 8—8 therein.

FIG. 9 is a top plan view of the same controls seen in the plane of line 9—9 in FIG. 7.

FIG. 10 is a cross-sectional view of part of the control mechanism shown in FIG. 9, as seen in the plane of line 10—10 therein.

DETAILED DESCRIPTION OF THE ILLUSTRATED EMBODIMENT

Figure 3:
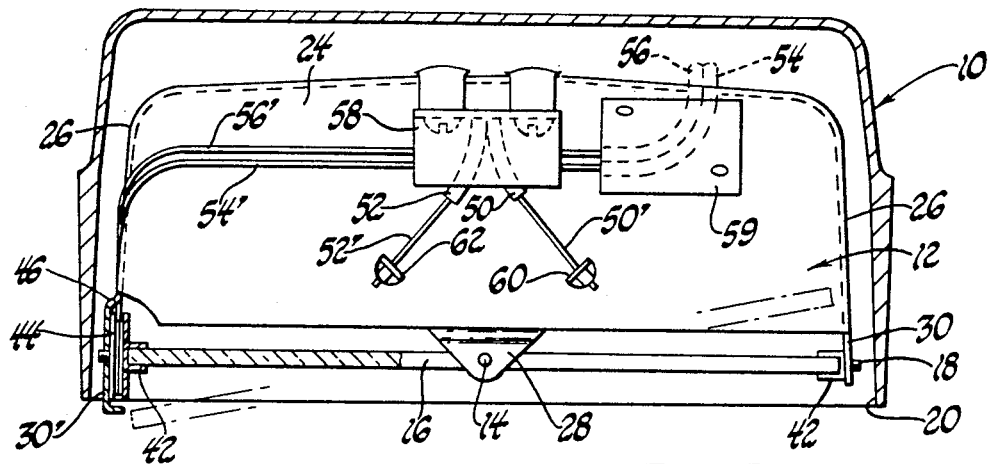
FIG. 3 is a top plan view of the same mirror as seen in the plane of line 3—3 in the first drawing figure.

The mirror structure shown in the drawings includes an outer housing or shell 10 within which is mounted a mirror supporting member 12 that is connected to the shell by vertically aligned pivot pin connections 14 and has a mirror member 16 pivotally and rotatably connected to it by horizontally aligned pivot pin connections 18.

The housing shell 10 is conventional in appearance, being of the type, general shape and approximate size, commonly used for outside remote control rear view mirrors. It has a rearwardly disposed opening 20 in which the mirror 16 is disposed and it is provided with an arm 22 by which it may be mounted on a vehicle door or fender wall panel.

The mirror supporting member 12 in the outer housing shell 10 has a back wall 24 that is semicylindrical in shape and sidewalls 26 that are engaged to it to provide an enclosed space within which the mirror 16 may be turned over. Tabs or ears 28, at the top and bottom ends of the curved back wall member 24 and between the sidewalls, are formed for the pivot connections 14 which provide the vertical axis for movement of the supporting member in the housing shell. Similar projections 30 and 30' are formed from the sidewalls 26 for the pivotal connections 18 that provide the horizontal axis about which the mirror member is operable.

In the particular embodiment shown, the vertical and horizontal axes for pivot movement and control of the mirror 16 intersect and are in a common plane, as best appreciated by reference to FIG. 3 (noting the relative location of pivotal connections 14 and 18). However, this intersecting relationship of the pivotal axes is not necessary to a practice of the invention. They can be relatively offset, other than straight upand-down, or across, and even reversed so that the mirror turns about a vertical axis, as for example when its width is less than its length.

It should also be noted here that the mirror supporting member 12 need not have totally enclosing back and sidewalls as shown. The important thing is to provide space behind the mirror so that it can be turned over without having anything in its way. The solid back and sidewall form shown is particularly good in this respect and it has the further advantage of hiding the operating cables behind it and providing a more finished appearance for the end product. The operational aspects of the mirror, however, are not dependent on the particular structure shown.

The mirror 16 is made by having a piece of smoked glass 32, of the desired size and shape, provided with a bright chrome, or like highly reflected surface 34 on one side as shown in FIG. 4. This assures a first surface bright image reflection, indicated as 36, from one side of the mirror and a first surface night viewing reflection 38, from the other side of the mirror and right off the face of the smoked glass.

Although other day-night mirror constructions might be used, the type described is believed to be the simplest and least expensive. Also, it will be appreciated that the relative thickness of the day-night mirror used will influence the clearance needed, between its peripheral edge and the back wall structure, in order to turn it over. Too large a clearance space would mean problems with leaves, road dirt and winter ice and snow getting behind the reversible mirror.

As regards the winter ice and snow problem with the embodiment shown, the curved back wall 24 on the part that actually carries the mirror affords good drainage and runoff for rain water so that icing and winter freeze is seldom ever a problem.

Referring to FIGS. 1 and 3, it will be seen that small clips 42 are used on the side edges of the mirror 16 and in conjunction with the pivot pins 18; these serve to mount the mirror on the supporting member for both viewing adjustment and so it can be turned completely over.

At one side of the mirror 16, the clip 42 includes a sheave 44 that is used to adjust and turn the mirror over. The sidewall projection 30' is formed to accommodate the sheave and has an offset 46 which provides a protective recess for it and aligns it with openings 48 in the sidewall for the cable means engaged thereto.

The control cables for operating the mirror include one pair 50, 52 for turning it from side-to-side, by operating the mirror supporting member, and another pair 54, 56 that are used to turn it over and adjust it up-and-down. They are sheathed cables with the actual operating strands identified 50', 52', 54' and 56', respectively, where they extend through the protective coverings.

The cable pair 50, 52 are received in the housing shell 10 through the mirror arm 22 and they are fastened to the back wall near the top by corner clamp 58. The clamp holds the ends of the sheaths but allows the operating strands 50' and 52' to extend therebeyond and to be attached to tabs 60 and 62 struck from the back wall part 24 of the mirror supporting member. The cable connections to the mirror supporting member are so disposed relative to the vertical axis about which it turns, as best shown in FIG. 3, that one or the other will turn it from side-to-side.

The other cable pair 54, 56 are also received through the mounting arm 22 into the shell behind the mirror supporting member 12. However, they are retained on the back of the mirror supporting member 12 by a guide clamp 59 that enables them to turn with the supporting member with reasonable freedom and without interfering with its movement. They are also attached to the supporting member 12 relatively over the cable access in the mirror arm 22, and sufficiently high up, that there is enough cable length inside the housing shell 10 to allow for lateral movement of the control cables and to avoid any axial movement that might cause cable wear where they are threaded into the shell through the arm 22.

The cable strands 54' and 56' are actually one and the same joined and formed to provide a loop or bite 62 received about the sheave 44 to turn it and consequently the mirror 16.

FIG. 2 best shows how the mirror 16 is capable of viewing adjustment and of being turned completely over, within the supporting member 12, by the same control cable means.

MIRROR OPERATING CONTROLS

Figure 5:
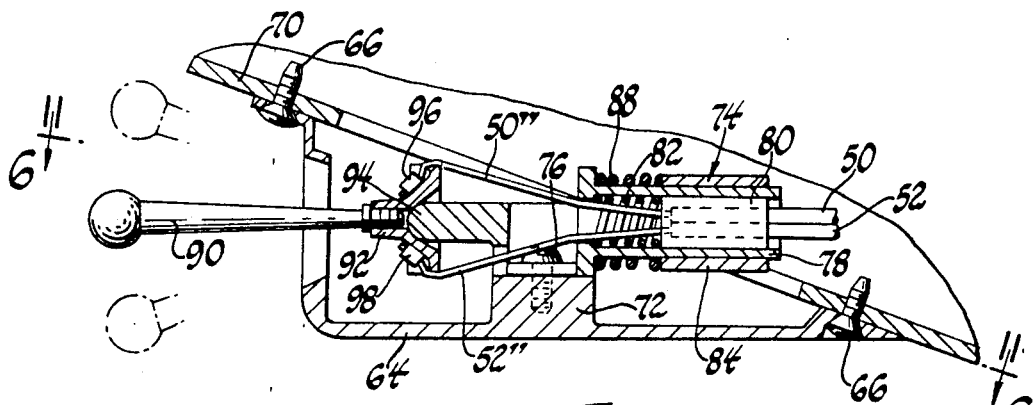
FIG. 5 is a cross-sectional view of a control means for operating the mirror shown in the previously mentioned drawing figures.
Figure 6:
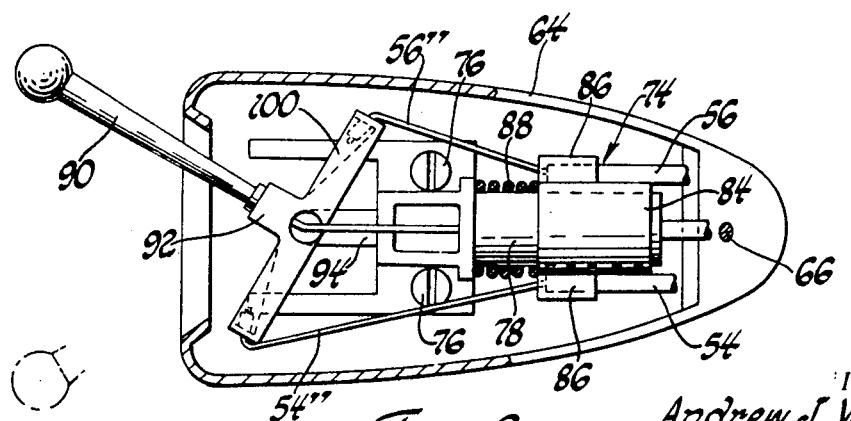
FIG. 6 shows the same control means as seen in the plane of line 6—6 in the preceding drawing figure.

FIGS. 5 and 6 show a relatively simple operating mechanism for the day-night remote control mirror of the present invention.

A cover member 64, which also serves as a decorative escutcheon, is fastened by screws 66 over an opening in a door or dashboard panel 70. It is formed to include a pad 72 on its inside wall and has a member 74 fastened to it by screws 76 to provide a mounting block for the mirror control mechanism.

A tubular part 78 is formed to receive the ends of the cable pair 50, 52 therewithin and with just the cable strand ends 50'' and 52'' passing therethrough. The sheaths are held by a member 80, slidable in the tubular part, and are under the compressive load of a spring 82 acting against it.

A sleeve 84 on the tubular part similarly receives the cable pair 54, 56 within receptive ears 86 on each side of it, allowing the cable strand ends 54'', 56'' to pass through, and placing the sheaths in compression by means of a spring 88 acting on the sleeve part.

The compressive loading of the sheaths enables use of fixedly located pivot points and axes for remote control mirrors while still allowing for relative growth and contraction of the sheaths and cable strands during installation; as best explained in my issued U.S. Pat. No. 3,407,684.

A control lever 90 with a socket end 92 is received on a ball head part 94 of the mounting block 74, provided for such purpose, and is held thereto by the tension load of the cable strands connected to it. The cable strands 50'' and 52'' are attached in close to the pivot point center, as shown in FIG. 5 at 96 and 98, while the other two mirror controlling strands 54'' and 56'' are engaged out near the ends of a crossbar 100, as shown in FIG. 6. This is so that up-and-down movement of the control lever 90 can be used to pull the operating cable strands that adjust the up-and-down viewing disposition of the mirror enough to turn the mirror over. And, at the same time, a lesser movement and/or synchronous side movement at each end of the flipover stroke will afford viewing adjustment of the day or night viewing side of the mirror, whichever is turned out.

Using FIGS. 2 and 6 to illustrate, when the control lever 90 is moved from its full line position to the dotted line one shown, it pulls back on cable strand 56'' and this movement is translated to its other end 56' at the mirror, to operate the sheave 44 and turn the mirror 16 over. If, however, the adjustment is relatively minor, at one end or the other of the flipover stroke, then the mirror is simply tilted up or down as needed to set it for good rearward vision.

The control lever 90 may be adjusted sideways, as between its full and dotted line positions in FIG. 5 (remembering that this is a top plan of the control), to obtain side viewing adjustment of the mirror at both the top and bottom positions, which represent the day and night dispositions of the mirror.

Accordingly, one simple control can be used to obtain both day-night reversal of the mirror and viewing adjustment of it in either selected position.

FIGS. 7–10 shown another control for the same type of day-night mirrors. It has separate means for turning the mirror over but enables viewing adjustment for both sides of the mirror through the same operator control.

A cover plate 102 is fastened to a door or dashboard panel 104. It has a small, round opening 106 near one side, through which a small control lever 108 extends, and it is provided with an arcuate protrusion 110 near the other side edge that has an elongated slot 112 in it through which extends another operator lever 114. Behind the cover plate, and fastened either to it or the panel 104, is a supporting bracket 116 that has a crossbar member 118 mounted on it and which is allowed to turn on an axis provided by the journal pin fastener 120. The control lever 108 is received in a slot 122 in the bar, as best shown in FIG. 10, and is pivotally connected to it by a pivot pin fastener 124.

A pulley-like sheave 126 is provided on the other end of the crossbar 118 which is turned to accommodate it, apart from the control lever 108, and for engagement by the operator lever 114. The latter is formed to include a disk 128 which is held against the sheave by the spring 130 and includes a short pin 132 and a longer pin 134 that are received in receptive holes 136, 138 in the sheave in order to turn it.

The reason for having one of the pins 134 on the operator disk longer than the other is so that it will extend through the sheave and can be engaged in one of the two holes provided in the crossbar member 118. These are identified as 140 and 142 in FIG. 8, and the uppermost one 140 is shown in FIG. 9 with the pin 134 engaged in it.

When the lever 114 is moved outwardly against the bias of spring 130, as in moving to the dotted line position for it shown in FIG. 9, the long pin 134 is removed from engagement with the cross bar 118 and the sheave can be turned independently. When it is released, and reengaged with the crossbar, then its movement is controlled by that of the bar which is, in turn, capable of rotatable adjustment, to a lesser extend, by control level 108.

The elongated slot 112, in which the lever 114 operates, is provided with offsets 144, 146 at its opposite ends that receive the lever 114 under the bias of the spring 130. In such offsets, the pin 134 is disposed for engagement within one of the crossbar holes 140, 142. But, when it is pulled out of them and into the midsection of the slot, it turns only the sheave 126.

The control cable ends for this particular control are identified with the same reference numbers 50'', 52'', 54'', 56'' as were used with the controls shown in FIGS. 5 and 6, since the control is operable of the same day-night mirror.

The cable ends 50'', 52'' are engaged to the control lever 108, as shown in FIG. 9, and the cable ends 54'', 56'' are fastened to the sheave 126, as best shown in FIG. 8.

Assuming that the lever 114 locates the day-night mirror 16 in the day viewing position, when disposed as shown in FIG. 8, movement of the lever out of the offset 144 and down the slot 112 will cause the independent rotation of sheave 126 and operation of cable ends 54'' and 56'' to turn the mirror over to its night viewing side.

The lever 114 will fall into the offset 146 at the lower end of slot 112, under the influence of spring 130, and pin 134 will be received in the crossbar hole 142. Once the sheave is engaged to the crossbar, the control lever 108 can operate the mirror by its own pivotal movement right or left, to actuable cable ends 50'', 52'' or by causing synchronous rotational movement of the crossbar up or down and corresponding viewing adjustment of the mirror through cable ends 54'', 56''.

Means are provided on the back of bracket 116 to receive both cable pairs and to place their sheaths in compression, much like discussed previously. Guide blocks 150, 152 on the guide members 154, 156 and under the bias of springs 158, 160 receive and act against the sheaths ends while allowing the cable ends to pass therethrough, so that the relative differences between the effective lengths of the sheaths and cable ends during installation, are accommodated.

I claim:

1. A remote control day-night rearview mirror, comprising a mirror member having day-night reflective surfaces on relatively opposite sides thereof, a mirror supporting member pivotal about a given axis and having said mirror member mounted thereon for pivotal adjustment about a different axis, and remote control cable means connected to said mirror and mirror supporting members for synchronous pivotal control thereof in adjusting the viewing disposition of said mirror and for rotational adjustment of said mirror to turn it about its pivotal axis as necessary to reverse the day-night viewing sides thereof.

2. The mirror of claim 1,
said mirror member being both pivotal and rotatably adjustable within said mirror supporting member.

3. The mirror of claim 2,
said remote control means including separate control cables connected to each of the pivotal members and a common control member having the control cables connected to it.

4. The mirror of claim 3,
said control member being mounted for pivotal movement in relatively transverse planes of reference in the viewing adjustment of said mirror, through said control cables, and for relatively extensive movement in one of said planes for turning the mirror over.

5. The mirror of claim 3, including
a housing open rearwardly and having said mirror supporting member mounted therein and including a rearwardly disposed opening of its own,
and said mirror member being mounted relatively within said rearwardly disposed openings with the control cables that are operative thereof protectively disposed between the walls of said housing and supporting member.

6. The mirror of claim 3,
the control cables which are operative of said mirror member being guided on the supporting member to avoid interference and restriction in the pivotal movement of the latter.

7. The improvement in rearview mirrors, comprising a single piece of smoked glass having a bright reflective surface for day viewing provided on one side thereof and the back of said bright reflective surface combined with said smoked glass affording a night viewing surface on the other side of said smoked glass, means engaging said glass piece at opposite side edges thereof and providing pivotal support for turning said glass piece over about a relatively horizontal axis, and additional remotely operated cable control means for selectively turning said glass piece over and for providing viewing adjustment at relatively opposite ends of its travel.

8. The improvement of claim 7, said additional means being operatively engaged with said glass piece at a location between and independent of said means of pivotal support and affording viewing adjustment about relatively transverse axes.

9. The improvement of claim 7, wherein said additional means comprises a remote control and a four cable connection having separate cable pairs for actuating said mirror about different axes.

10. Means for operating and controlling the viewing disposition of a remote control rear view mirror having reversible sides, for day-night viewing, and comprising;
a control lever having cable means connected thereto for viewing adjustment of a mirror member about relatively transverse pivotal axes,
and means interposed between said control lever and the cable means that is operative of said mirror about one of said axes for turning said mirror over and providing viewing adjustment for each side thereof.

11. The mirror operating and controlling means of claim 10, said lever being pivoted and said last mentioned means including leverage applying arm extensions of sufficient length to accomplish the aforesaid purpose.

12. The mirror operating and controlling means of claim 10, said last mentioned means including a member disposed relatively apart from said lever arm and selectively engaged to said lever arm for day-night adjustment operation of said mirror thereby.

13. A remote control day-night rearview mirror, comprising;
an outer covering;
a mirror supporting member mounted within said covering for control cable actuated pivotal adjustment about a generally vertical axis,
a mirror member having day-night reflective surfaces on relatively opposite sides thereof and means of pivotal engagement with said mirror supporting member provided at its side edges for control cable actuated pivotal adjustment about a generally horizontal axis and rotation through at least 180°, and remotely disposed control means including laterally flexible control cable means received within said casing and connected to said mirror and mirror supporting members for viewing adjustment of said mirror alone and together with said supporting member and for rotation of said mirror member as necessary to change the day-night viewing disposition thereof.

14. A day-night mirror assembly, comprising support means, a mirror member having first and second reflective surfaces formed thereon on generally opposite sides thereof, gimbal means operatively connecting said mirror member to said support means, said gimbal means comprising first and second pivotal axes generally normal to each other, and remotely situated control means operatively connected to said mirror member and said gimbal means for adjusting and controlling the position of said gimbal means and said mirror member, said control means comprising manual actuating means, first motion transmitting means operatively connected to said manual actuating means and said gimbal means for at times causing pivotal rotation of said gimbal means about said first pivotal axis, and second motion transmitting means operatively connected to said manual actuating means and said mirror member for at times causing pivotal rotation of said mirror member about said second pivot axis, said second motion transmitting means being effective to at selected times cause sufficient rotation of said mirror member as to obscure from view said first reflective surface while presenting to view said second reflective surface, and said second motion transmitting means being further effective to at selected times cause relatively slight rotation of said mirror member in order to adjust the angle of view of such of said first or second reflective surface as is presented to view.

15. A day-night mirror assembly according to claim 14, wherein said support means comprises an outer housing, wherein said gimbal means and said mirror member are received generally within an open end of said outer housing, and wherein said first pivotal axis is defined by first and second aligned pivot means carried by said outer housing in a manner as to be generally on opposite sides of said mirror member.

16. A day-night mirror assembly according to claim 14, wherein said support means comprises an outer housing, wherein said gimbal means and said mirror member are received generally within an open end of said outer housing, wherein said first pivotal axis is defined by first and second aligned pivot means carried by said outer housing in a manner as to be generally on opposite sides of said mirror member, and connected to an intermediate gimbal member, and wherein said second pivot axis is defined by third and fourth aligned pivot means carried by said intermediate gimbal member and operatively connected to said mirror member on opposite sides thereof.

17. A day-night mirror assembly according to claim 14, wherein said manual actuating means comprises a first lever moveable to and between two extreme operating positions, wherein said first motion transmitting means comprises first flexible cable means interconnecting said first lever and said gimbal means for rotation of said gimbal means about said first pivotal axis corresponding to actuation of said first lever, wherein said manual actuating means also comprises a second lever moveable to and between other two extreme operating positions, and wherein said second motion transmitting means comprises second flexible cable means interconnecting said second lever and said mirror member, said second lever being effective whenever in one of said other two extreme operating positions to place said mirror member in a position whereby said first reflective surface is presented for viewing and said second lever also being effective whenever in the second of said other two extreme operating positions to place said mirror member in a position whereby said second reflective surface is presented for viewing.

* * * * *